April 27, 1965 B. D. LEE ETAL 3,181,081
GATED MULTIVIBRATORS
Original Filed June 25, 1957
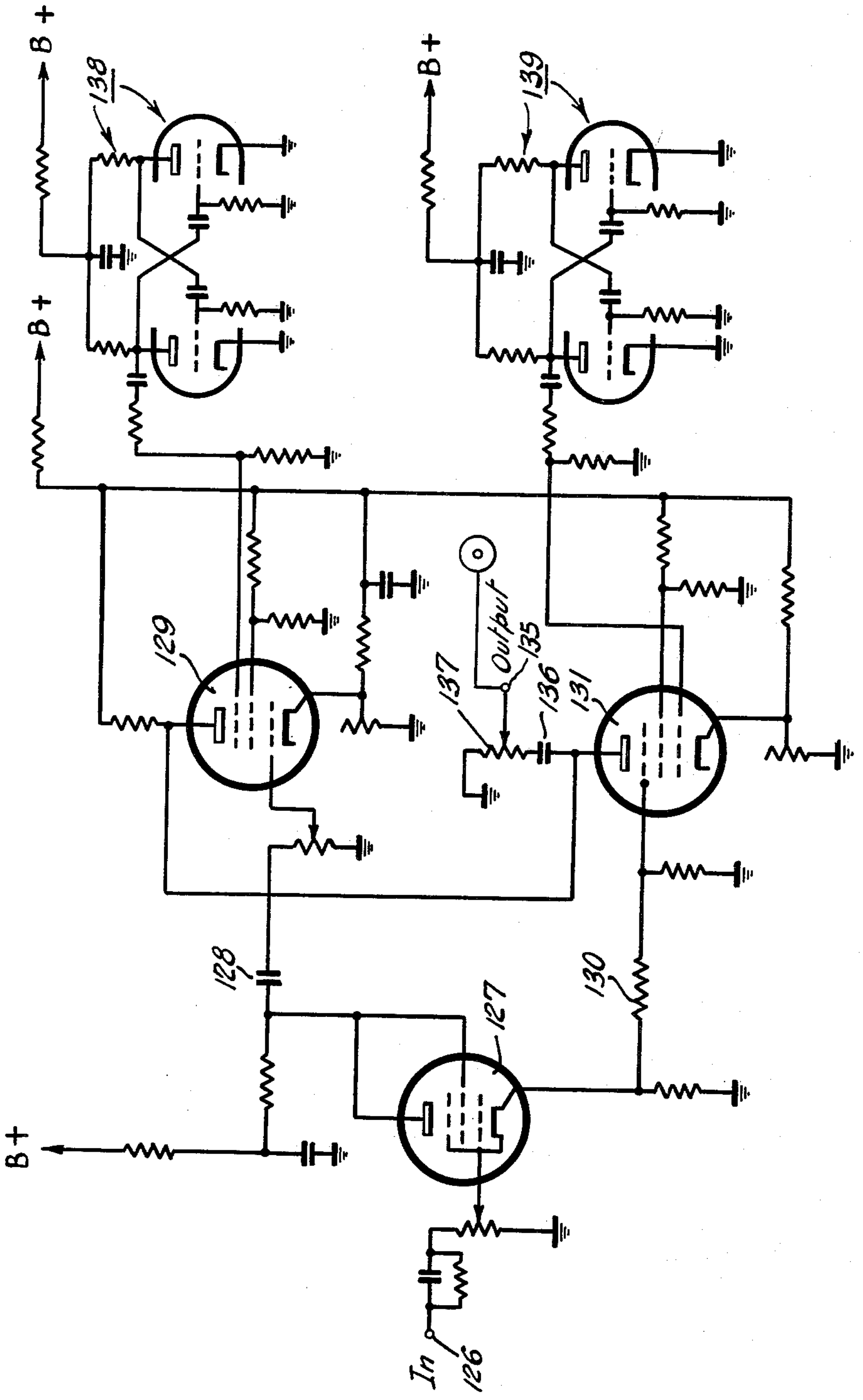

United States Patent Office 3,181,081

Patented Apr. 27, 1965

3,181,081
GATED MULTIVIBRATORS

Burton D. Lee and Sam L. Wilkinson, Houston, Tex., assignors to Texaco Inc., a corporation of Delaware Original application June 25, 1957, Ser. No. 667,894, now Patent No. 3,040,294, dated June 19, 1962. Divided and this application Feb. 2, 1962, Ser. No. 170,716
2 Claims. (Cl. 331—49)

This invention is concerned with the analysis of seismic records. More specifically, it involves the analysis of seismic records which have been made on, or recorded in the form of, magnetic tapes.

Other more specific objects of the invention include the provision of an electronic circuit for generating a sharp timing signal by switching from a given frequency output signal to a relatively very different frequency output signal, instantaneously.

Certain embodiments of the invention are described below in some detail by way of illustrative examples and are illustrated in the drawing in which:

The figure of drawing is a schematic circuit diagram illustrating in greater detail one form of synchronous pulse generator which may be employed in the systems of prior application Serial No. 667,894 filed June 25, 1957, now Patent No. 3,040,294 of which this is a division.

Although various arrangements could be had for providing a synchronous pulse to be written onto the control track of a high speed drum, it is preferred to use a synchronous pulse generator in accordance with this invention. This pulse generator makes use of a switching electronically from the application of one relatively low frequency to another signal of a relatively high frequency. This switching is carried out practically instantaneously to thus create in effect a square wave pulse on the track of the drum, by reason of this relatively instantaneous shift of the carrier frequency applied to the control track write head.

Referring to the figure of drawing, a schematic circuit showing such a synchronous pulse generator is illustrated. The input pulse as received from a timer (illustrated in FIG. 6 of the aforementioned application Patent No. 3,040,294 (with reference numeral 80 applied)) is applied to an input terminal 126. This pulse is then applied to the grid of a tube 127 via a potentiometer type input circuit. Tube 127 is connected in a dual output type of circuit such that the input pulse introduced at terminal 126 and applied to the grid of the tube 127 will create an output signal in the main current path through tube 127. The plate circuit output is passed on via a capacitor 128 to the control grid, or input circuit, of a gate tube 129. The other output circuit from tube 127 is a cathode follower output connection that is passed on via a resistor 130 to the suppressor grid of another gate tube 131. The gate tubes 129 and 131 are arranged so that in the absence of any signals, one of the gates is opened while the other is closed. This means that the gate which is opened is passing a signal from a connection to a multivibrator that is oscillating at a relatively high or at a relatively low frequency as desired. Thus, one of these two frequencies is being passed to the output circuit for the entire synchronous pulse generator 81 (of FIG. 6 in Patent No. 3,040,294), which output is common to both gate tubes 129 and 131 and includes an output terminal 135 which is connected to the plates of the gate tubes via a capacitor 136 and a grounded resistor 137 which has a variable potentiometer-tap connection thereon for determining the attenuation of the output.

There are two multivibrators 138 and 139 that each employ a pair of triodes (two halves of a twin triode tube). The output of multivibrator 138 is connected to the suppressor grid of gate tube 129, while the output of multivibrator 139 is connected to the control grid of gate tube 131. It will be clear to anyone skilled in the art that each of these two separate multivibrators 138 and 139 may be so arranged as to provide a given output frequency, depending upon the circuit constants employed. Thus, for example, the multivibrator 138 is arranged to provide a six kilocycle signal while the other multivibrator 139 provides a 2300 cycle signal. Thus, the above indicated will take place as the input pulse received from a timer at input terminal 126 causes a sudden shift in the output signal at terminal 135 from the six kilocycle signal that is being passed by the open gate to the 2300 cycle signal which will then be passed by the other gate as it is opened momentarily, during which time the first gate will be closed. This arrangement allows the direct recording of the steep front pulse created, without the need for modulating a carrier signal. Furthermore the wave front of this pulse is practically perpendicular. In order to even approach this slope, on the wave front of a pulse created by modulating a carrier, would be relatively difficult.

The aforementioned carrier frequency is, for example, one of 5–10 kilocycles per second. This has been pointed out in the parent application mentioned above (Patent No. 3,040,294) which refers to an earlier Patent No. 2,620,890.

While certain embodiments, including methods and apparatus involved in the carrying out of this invention, have been described in considerable detail in accordance with the applicable statutes, this is not to be taken as in any way limiting the invention but merely as being descriptive thereof.

We claim:

1. In an A.C. frequency modulated magnetic recording system employing a given carrier frequency, an improved steep-front pulse generator comprising an input for receiving a control pulse, an output for transmitting signals to the magnetic medium of said recording system, a pair of electronic gates connected to said output, a relatively low frequency multivibrator compared to the carrier frequency for said recording system, a relatively high frequency multivibrator compared to said multivibrator low frequency, circuit means for connecting each of said multivibrators respectively to said gates, one of said gates being normally open and the other of said gates being normally closed, and an electron tube having a plate, a cathode and a control grid, circuit means for connecting said control grid to said input, circuit means for connecting said plate to one of said gates for controlling whether said one gate is open or closed, circuit means for connecting said cathode to the other of said gates for controlling whether said other gate is open or closed.

2. In an A.C. frequency modulated magnetic recording system employing a given carrier frequency; an improved steep-front pulse generator comprising

- an input for receiving a control pulse;
- an output for transmitting signals to the magnetic medium of said recording system;
- a pair of electronic gates connected to said output, each of said gates comprising
  - a multiple electrode electron tube having at least two grids in addition to an anode and a cathode;
- a relatively low frequency multivibrator compared to the carrier frequency for said recording system;
- a relatively high frequency multivibrator compared to said multivibrator low frequency;
- circuit means for connecting each of said multivibrators to one of said grids of one of said gate tubes respectively for passing the frequency signal thereof to said output to the mangitude medium when the respective gate tube is conducting;
- a control electron tube having at least a plate, a cathode and a control grid;

said control tube being connected in a dual output circuit for controlling the state of said gate tubes;

one gate being open and the other closed in the absence of said control pulse;

said dual output circuit comprising first circuit means for connecting said control tube plate to the other of said grids of one of said gate tubes;

second circuit means for connecting said control tube cathode to the other of said grids of the other of said gate tubes; the circuit constants for said dual output circuit being such that the presence of said control pulse will shift the state of said gate tubes to the opposite condition from that when said control pulse is absent.

References Cited by the Examiner

UNITED STATES PATENTS

| | | | |
|---|---|---|---|
| 2,460,900 | 2/49 | Newbold | 331—49 XR |
| 2,929,874 | 3/60 | Cupella | 331—49 XR |

FOREIGN PATENTS

| | | |
|---|---|---|
| 628,257 | 8/49 | Great Britian. |

ROY LAKE, *Primary Examiner.*

JOHN KOMINSKI, *Examiner.*